United States Patent [19]

Meade et al.

[11] Patent Number: 4,958,725
[45] Date of Patent: Sep. 25, 1990

[54] CONVEYOR GUIDE RAILING ASSEMBLY

[75] Inventors: Alan J. Meade, Lynchburg; Paul W. Smith, Forest, both of Va.

[73] Assignee: Simplimatic Engineering Company, Lynchburg, Va.

[21] Appl. No.: 243,434

[22] Filed: Sep. 12, 1988

[51] Int. Cl.⁵ .............................................. B65G 15/00
[52] U.S. Cl. ................................................... 198/836.1
[58] Field of Search .............................. 198/836, 860.3

[56] References Cited

U.S. PATENT DOCUMENTS

| | | | |
|---|---|---|---|
| 2,891,296 | 6/1959 | Darde | 24/81 |
| 3,080,140 | 3/1963 | Gohs et al. | 248/74 |
| 3,325,131 | 6/1967 | Englander et al. | 248/251 |
| 3,491,873 | 1/1970 | Fauth | |
| 3,669,244 | 6/1972 | Pagdin et al. | |
| 3,788,457 | 1/1974 | Valentino, Jr. | 198/836 |
| 3,854,688 | 12/1974 | Shuford | 248/316 |
| 4,225,035 | 9/1980 | Mohney et al. | 198/836 |
| 4,244,544 | 1/1981 | Kornat | 248/68 |
| 4,260,123 | 4/1981 | Ismert | 248/74 |
| 4,511,031 | 4/1985 | Lachonius | 198/836 |
| 4,535,963 | 8/1985 | Lachonius | 248/251 |
| 4,738,352 | 4/1988 | Norbut | 198/836 X |

FOREIGN PATENT DOCUMENTS 2439804 3/1976 Fed. Rep. of Germany ...... 198/836

OTHER PUBLICATIONS

Valu Guide Conveyor Components brochure, Sep. 1987, Technical Folio No. 115.

Primary Examiner—Joseph J. Rolla
Assistant Examiner—Cheryl L. Gastineau
Attorney, Agent, or Firm—St. Onge Steward Johnston & Reens

[57] ABSTRACT

An improved guide railing assembly for a conveyor system is provided comprising an elongated railing for providing lateral support to articles being conveyed along a path defined by the conveyor, the railing having a substantially half-moon shaped cross-section. A generally U-shaped clamp is also provided having a pair of gripping fingers corresponding to the legs of the U, the fingers being curved toward each other in a shape substantially corresponding to the curvature of the curved surface. The fingers are spaced apart a sufficient distance to receive therebetween at least the railing, the bottom portion of the U being generally concave and forming an aperture therethrough for receiving a fastener for fastening said clamp to a support member associated with the conveyor, the clamp being spring-like to respond to a tightening of the fastener by tending to flatten the bottom of the U and force the fingers towards each other in a gripping fashion on the railing therein, whereby the railing can be reliably retained by the clamp in a preselected position relative to the conveyor path. A plastic cover is also provided for the elongated railing.

10 Claims, 3 Drawing Sheets

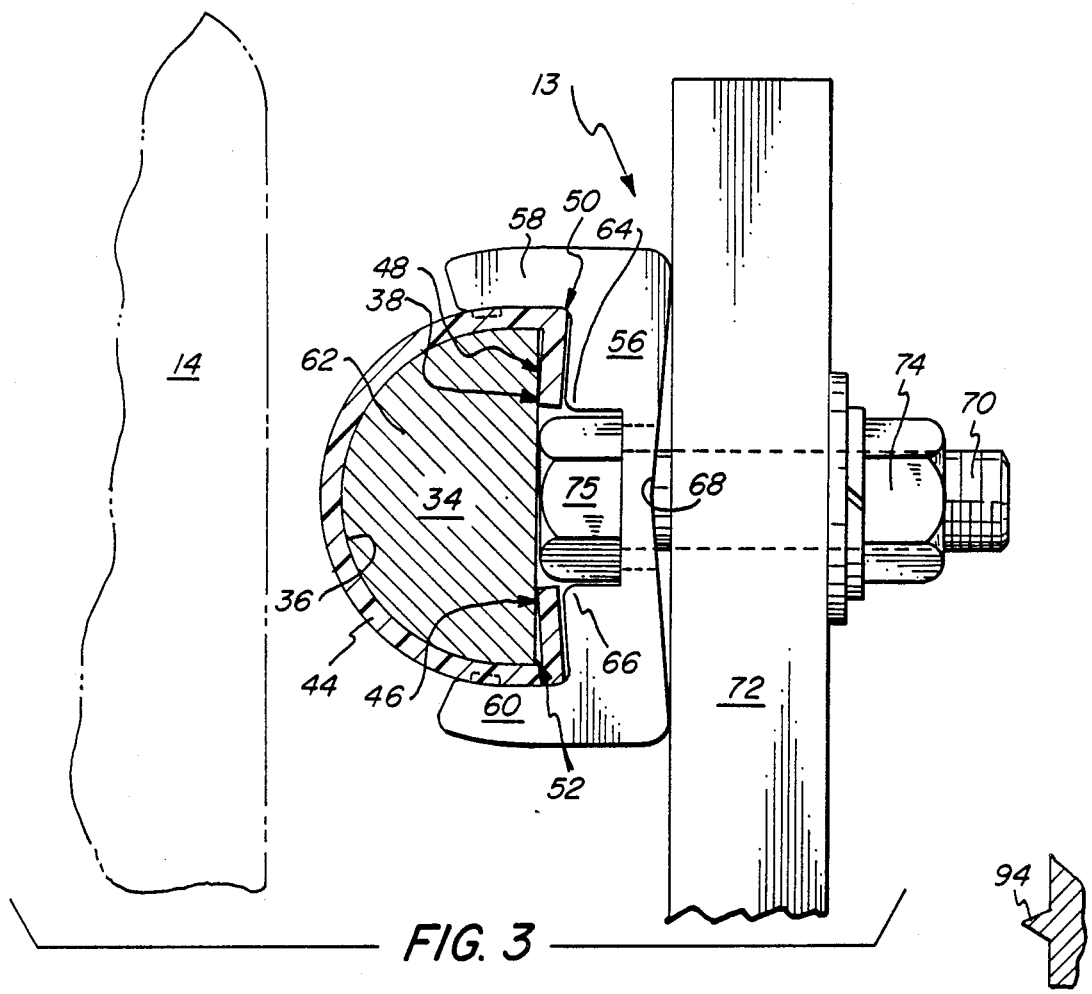
FIG. 3
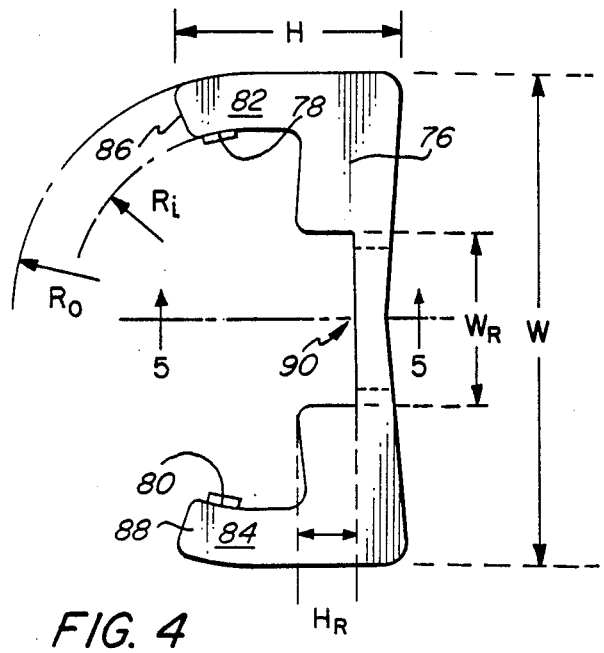
FIG. 4
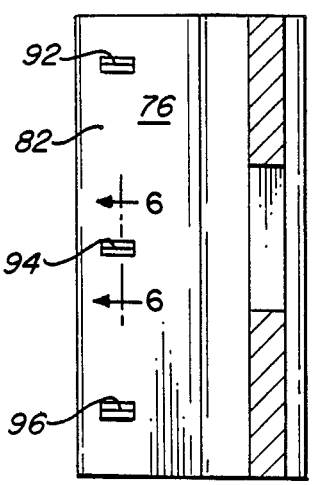
FIG. 6
FIG. 5

CONVEYOR GUIDE RAILING ASSEMBLY

FIELD OF THE INVENTION:

The present invention relates to conveyor guide railing assemblies. In particular, an improved guide railing assembly is disclosed having a half moon shaped railing, which railing can also be encased in part by a plastic cover. The railing or the cover-railing combination is held in place by a correspondingly shaped clamp for retaining the railing in place against forces applied longitudinally along the direction of the railing.

BACKGROUND OF THE INVENTION:

It is known in the art of article carrying conveyors to provide guide railings along the conveyor path to restrain articles being conveyed therealong against falling off the sides of the conveyor.

FIG. 1 shows a conveyor with a conveyor guide railing assembly of the prior art. A conveyor beam 10 supports a chain 12 that moves therealong to convey bottles such as 14. Left and right guide railing assemblies 16 and 18 are mounted on uprights 20 and 22 to provide lateral guidance for bottle 14. With respect to assembly 16, a metal sheath 24 grips a polyethylene insert 26 under the influence of clip 28 and bolt 30. The fingers of clip 28 are urged inward as bolt 30 is tightened due to the generally concave shape of the bottom 32 of clip 28.

The shortcomings of this assembly include the difficulty of keeping insert 26 in sheath 24 on both vertical and horizontal curves. Also, the railing assembly tends to slip longitudinally, or in the direction of the conveyor path and the railing, because of the difficulty of attaining adequate clamping force on the sheath 24 and insert 26.

Other rail mounting assemblies are shown in U.S. Pat. Nos. 3,325,131; 3,491,873; 3,669,244; 3,788,457; 3,854,688; and 4,225,035.

SUMMARY OF THE PRESENT INVENTION:

In the preferred embodiment of the present invention, an improved guide railing assembly is provided having a railing with a half-moon cross-sectional shape. In one particularly preferred embodiment, this railing is encased in a plastic cover conforming to the shape of the railing. A U-shaped clamp grips the plastic cover-railing combination to securely retain the combination, particularly against longitudinally directed forces. Also, by simply loosening the clamp, the railing assembly can readily be slid or repositioned longitudinally to a new location to accommodate a change in the length or configuration of the conveyor beam.

It is an object of the present invention to provide an improved guide railing assembly wherein the railing is securely retained against becoming loosened, repositioned, or maladjusted.

It is a further object of the present invention to provide an improved guide railing assembly that can readily be used on curves.

It is a further object of the present invention to provide an improved guide railing assembly that can be efficiently repositioned without complete disassembly.

Further objects and advantages of the present invention will become apparent from the following description of the drawings and the preferred embodiments.

BRIEF DESCRIPTION OF THE DRAWINGS

FIG. 2A shows a length of the cover of the present invention in perspective;

FIG. 3 shows an end view in partial cross-section of the improved guide railing assembly of the present invention;

FIG. 4 shows an end view of the clamp used in connection with the present invention;

FIG. 5 shows an end view in partial cross-section of the clamp of the present invention; and FIG. 6 shows a cross-section of one of the teeth of the clamp of FIG. 5.

DETAILED DESCRIPTION OF THE PREFERRED EMBODIMENT

Figure 1:
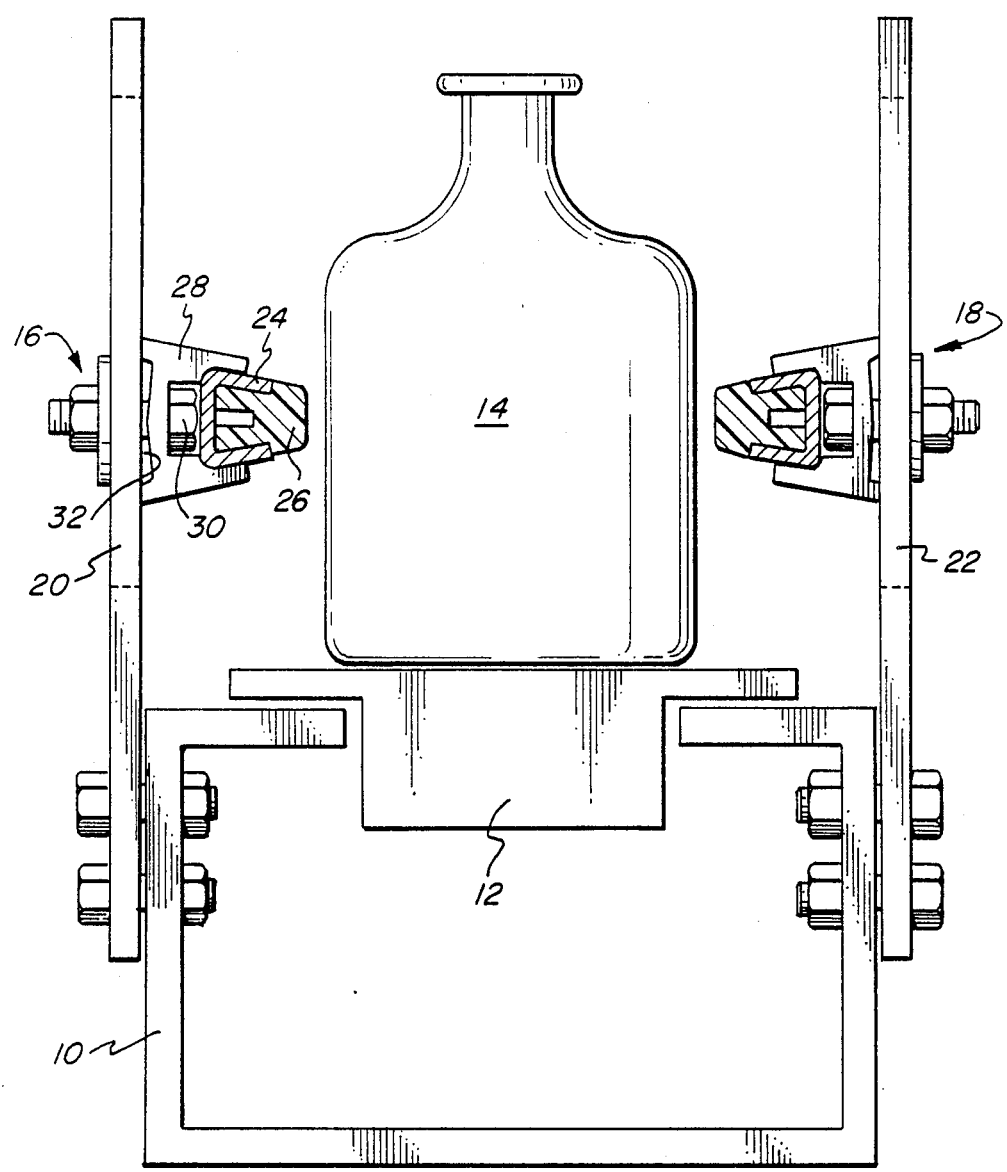
FIG. 1 shows an end view of a prior art guide railing assembly in partial cross-section.
Figure 2:
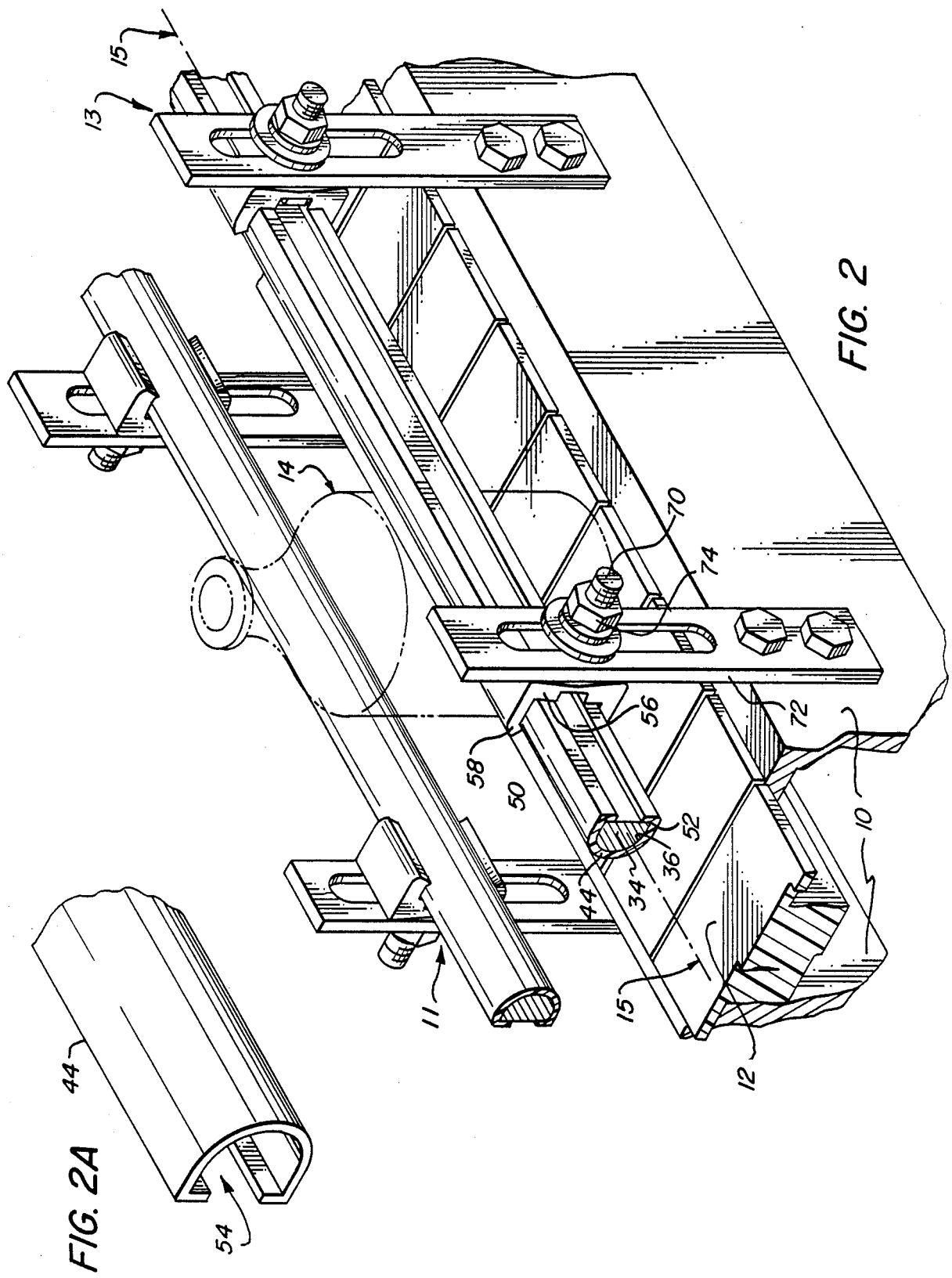
FIG. 2 shows a conveyor section in perspective with the improved guide railing assemblies of the present invention mounted thereon.

With reference to FIGS. 2 and 3, a length of conveyor is shown with chain 12 mounted onto a conveyor beam 10 with the improved railing assemblies 11 and 13 of the present invention mounted along both the left and right sides thereof. The two assemblies are the same and are described in detail only with respect to the right-handed assembly 13 shown in more detail in FIG. 3.

A railing 34, preferably formed of a suitable material such as for example stainless steel, extends along a longitudinal axis 15 generally parallel to the conveyor path, and has a half-moon cross-section defined by a curved surface 36 generally facing towards the article 14 being conveyed along the conveyor path indicated generally as figure number 40. Railing 34 has a relatively flat surface 38 facing away from the conveyor path 40 and the article 14 to be conveyed.

Cover 44, also elongated, is preferably formed from a polyethylene or other suitable plastic extrusion and encases railing 34 primarily on the surface 36 facing path 40 and also portions 46 and 48 of the flat surface 38 adjacent junctures 50 and 52 between the curved and flat surfaces of railing 34. Cover 44 is open along the back at 54 for ease of assembly, allowing the cover to snap on over the railing. Cover 44 is preferably about 0.0625" thick, although other suitable thicknesses may be employed, and is sufficiently resilient to substantially correspond to the shape of railing 34.

Although the cover 44 is preferred, it is understood that the railing 34 can be clamped without the cover, although a greater clamping force would typically be necessary.

Clamp 56 is substantially U-shaped and has curved fingers 58 and 60 for engaging and gripping the railing or the cover-railing combination as the case may be as indicated generally at 62. Ledges 64 and 66 are formed in clamp 56 to abut portions 46 and 48 of cover 44. Fingers 58 and 60 are spaced apart a sufficient distance to permit cover-railing combination 62 to be inserted therebetween before the tightening and clamping operation.

The bottom 68 of clamp 56 is generally concave, and clamp 56 is formed of spring-like material, such as for example a composite plastic or suitable metal, such that bolt 70 in fastening clamp 56 to upright support 72 pulls the bottom 68 generally towards support 72 to thereby urge fingers 58 and 60 inwardly to grippingly engage the cover-railing combination 62 as nut 74 is tightened.

Head 75 of bolt 70 is restrained against turning by the locking fit between ledges 64 and 66 on clamp 56. Cover 44 in engagement with fingers 58 and 60 thereby restrains the cover-railing combination 62 against slippage in a longitudinal direction when nut 74 is sufficiently tight. However, when nut 74 is loosened, cover 44 is readily released from such engagement to be slippingly adjusted back and forth longitudinally as desired.

In a particularly preferred embodiment shown in FIG. 4, clip 76 has rows of teeth 78 and 80 formed on the inwardly facing sides of fingers 82 and 84. Clamp 76 is preferably formed of a composite plastic with the teeth being of the same material, although other materials such as aluminum or stainless steel could be used as well. Clamp 76 preferably has a width W of approximately 1.125 inches and a height H of approximately 0.5625 inches, although other suitably proportioned dimensions could be used as well. Each finger adjacent its respective outer extremities 86 and 88 preferably has an inner radius of curvature $R_i$ of about 0.4375 inches and an outer radius of curvature $R_o$ of about 0.5625 inches. The recess 90 for receiving a fastener head such as the bolt shown in FIG. 2, is approximately 0.5 inches wide and 0.1875 inches deep as indicated by the variables $W_R$ and $H_R$. It is understood that these dimensions are by way of example only of the preferred embodiment and are not intended to be limiting of the invention.

FIG. 5 shows a sectional view of clamp 76 of FIG. 4 taken in the direction of cross-section 5—5. There are three substantially similar teeth 92, 94, and 96 in row 78. Tooth 94 is further shown in cross-section 6—6 in FIG. 6 to have an angular shape for gripping the plastic sheathing.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

We claim:

1. An improved guide railing assembly for a conveyor system, said assembly comprising:
   (a) an elongated railing for providing lateral support to articles being conveyed along a path defined by said conveyor, said railing having a curved surface for facing towards said path, said railing further having a relatively flat surface for facing away from said path, said curved surface joining said flat surface along two junctions extending parallel to said path, said railing having a substantially half-moon shaped cross-section; and
   (b) a generally U-shaped clamp having a pair of gripping fingers corresponding to the legs of said U, said fingers being curved toward each other in a shape substantially corresponding to the curvature of said curved surface, said fingers being spaced apart a sufficient distance to receive therebetween at least said railing, the bottom portion of said U being generally concave and forming an aperture therethrough for receiving means for fastening said clamp to a support member associated with said conveyor, said clamp being spring-like to respond to a tightening of said fastening means by tending to flatten the bottom of said U and force said fingers towards each other in a gripping fashion on a portion of said curved surface of said railing therein,
whereby said railing can be reliably retained by said clamp in a preselected position relative to said conveyor path.

2. The assembly of claim 1, further including an elongated cover formed from a resilient material for slipping over said railing and covering said curved surface and at least portions of said flat surface adjacent said junctions, said cover for substantially corresponding to the shape of said curved surface, said fingers for gripping said cover and said railing therebetween.

3. The assembly of claim 2, wherein said fingers further include means for holding said cover and thereby said railing in a direction defined by a longitudinal axis of said railing.

4. The assembly of claim 3, wherein said holding means comprises at least one tooth formed on the inwardly facing side of said finger, said tooth for engaging said cover as said fingers are urged inwardly.

5. The assembly of claim 4, wherein said holding means further comprises a plurality of teeth on each finger, said teeth having a size and shape for penetrating at least part way into said cover to grippingly retain same against longitudinally directed forces.

6. An improved guide railing assembly for a conveyor system, said assembly comprising:
   (a) an elongated railing for providing lateral support to articles being conveyed along a path defined by said conveyor, said railing having a curved surface for facing towards said path, said railing further having a relatively flat surface for facing away from said path, said curved surface joining said flat surface along tow junctions extending parallel to said path, said railing having a substantially half-moon shaped cross-section;
   (b) an elongated cover formed from a resilient material for slipping over said railing and covering said curved surface and at least portions of said flat surface adjacent said junctions, said cover for substantially corresponding to the shape of said curved surface, said cover further forming an opening lengthwise therealong opposite said curved surface, said opening for positioning over at least a portion of said flat surface; and
   (c) a generally U-shaped clamp having a pair of gripping fingers corresponding to the legs of said U, said fingers being curved toward each other in a shape substantially corresponding to the curvature of said curved surface, said fingers being spaced apart a sufficient distance to receive therebetween at least said railing, the bottom portion of said U being generally concave and forming an aperture therethrough for receiving means for fastening said clamp to a support member associated with said conveyor, said clamp being springlike to respond to a tightening of said fastening means by tending to flatten the bottom of said U and force said fingers towards each other in a gripping fashion on said cover and railing therein,
whereby said railing can be reliably retained by said clamp in a preselected position relative to said conveyor path.

7. The assembly of claim 6, wherein said flat surface has a width, and said opening has a width substantially less than the width of said flat surface, whereby said cover has portions thereof abutting portions of said flat surface adjacent said junctions.

8. The assembly of claim 7, wherein said fingers form outwardly facing ledges back from the tips of said fingers for abutting said portions of said cover abutting said flat surface.

9. An improved guide railing assembly for a conveyor system, said assembly comprising:
   (a) an elongated railing for providing lateral support to articles being conveyed along a path defined by said conveyor, said railing having a curved surface for facing towards said path, said railing further having a relatively flat surface for facing away from said path, said curved surface joining said flat surface along two junctions extending parallel to said path, said railing having a substantially half-moon shaped cross-section;
   (b) an elongated cover formed from a resilient material for slipping over said railing and covering said curved surface ant at least portions of said flat surface adjacent said junctions, said cover for substantially corresponding to the shape of said curved surface, said cover being formed from a plastic material and said railing being formed from a metallic material; and
   (c) a generally U-shaped clamp having a pair of gripping fingers corresponding to the legs of said U, said fingers being curved toward each other in a shape substantially corresponding to the curvature of said curved surface, said fingers being spaced apart a sufficient distance to receive therebetween at least said railing, the bottom portion of said U being generally concave and forming an aperture therethrough for receiving means for fastening said clamp to a support member associated with said conveyor, said clamp being springlike to respond to a tightening of said fastening means by tending to flatten the bottom of said U and force said fingers towards each other in a gripping fashion on said cover and railing therein, whereby said railing can be reliably retained by said clamp in a preselected position relative to said conveyor path.

10. An improved guide railing assembly for a conveyor system, said assembly comprising:
   (a) an elongated railing for providing lateral support to articles being conveyed along a path defined by said conveyor, said railing having a curved surface for facing towards said path, said railing further having a relatively flat surface for facing away from said path, said curved surface joining said flat surface along two junctions extending parallel to said path, said railing having a substantially half-moon shaped ross-section;
   (b) an elongated cover formed from a resilient material for slipping over said railing and covering said curved surface and at least portions of said flat surface adjacent said junctions, said cover for substantially corresponding to the shape of said curved surface, said cover comprising a polyethylene and said railing comprising a stainless steel; and
   (c) a generally U-shaped clamp having a pair of gripping fingers corresponding to the legs of said U, said fingers being curved toward each other in a shape substantially corresponding to the curvature of said curved surface, said fingers being spaced apart a sufficient distance to receive therebetween at least said railing, the bottom portion of said U being generally concave and forming an aperture therethrough for receiving means for fastening said clamp to a support member associated with said conveyor, said clamp being springlike to respond to a tightening of said fastening means by tending to flatten the bottom of said U and force said fingers towards each other in a gripping fashion on said cover and railing therein, whereby said railing can be reliably retained by said clamp in a preselected position relative to said conveyor path.

* * * * *

UNITED STATES PATENT AND TRADEMARK OFFICE
CERTIFICATE OF CORRECTION

PATENT NO. : 4,958,725
DATED : Sepetmber 25, 1990
INVENTOR(S) : ALAN J. MEADE and PAUL W. SMITH It is certified that error appears in the above—identified patent and that said Letters Patent is hereby corrected as shown below:

Col. 2, line 35, delete "figure".

FIG. 3 and on the face of the patent, between article 14 and curved finger 58, insert --40-- without a lead line to identify the conveyor path.

Col. 5, line 18, delete "ant" and insert --and--.

Signed and Sealed this

Thirty-first Day of March, 1992

Attest:

HARRY F. MANBECK, JR.

*Attesting Officer*        *Commissioner of Patents and Trademarks*